Sept. 26, 1950  E. MITTELMANN  2,523,476
WATTMETER
Filed April 23, 1946

INVENTOR.
Eugene Mittelmann
BY
Maurice S. Cayne
attys.

Patented Sept. 26, 1950

2,523,476

UNITED STATES PATENT OFFICE 2,523,476

WATTMETER

Eugene Mittelmann, Chicago, Ill.

Application April 23, 1946, Serial No. 664,146

14 Claims. (Cl. 171—95)

1

The present invention relates to a circuit arrangement and apparatus for measuring the power absorbed by the load only in a high frequency field.

In high frequency circuits, particularly such circuits now commonly in use for heating materials with high frequency energy, it is desired to obtain an indication of the power absorbed by such material. It has been common to provide measuring devices which indicate the total power output of a high frequency generator which is supplying energy to heat material by either a capacitive or inductive apparatus. The total power output, however, may be quite different from the power absorbed. In my prior Patent Re. 22,258 I disclosed means capable of measuring the power absorbed. Such means, however, requires certain calibrating manipulations which it is desired to avoid.

In that prior patent, it was pointed out that the secondary resonance circuit in which the heater was included can be denoted by two equivalent circuits, one for no-load conditions and the other for load conditions, the no-load condition being denoted by a circuit having an inductance, a capacitance and a single resistor $R_0$ in parallel with each other and connected across a source of high frequency. The load condition is denoted by the same circuit to which a resistor $R_1$ is added in parallel with the resistor $R_0$. On the basis of such circuits it was shown it is possible to calibrate a galvanometer shunting resistor so that for different loads the resistor can be adjusted to cause the galvanometer to indicate the power absorbed by the load. This is not entirely satisfactory, however, because it requires the adjustment of the shunt resistor for each different load. My present invention overcomes that difficulty and makes it possible to meter the power absorbed without adjusting the meter on changes in load.

Other and further objects of the present invention subsequently will become apparent by reference to the following description taken in connection with the accompanying drawing wherein:

Figure 1 illustrates a circuit arrangement and apparatus for indicating directly the power absorbed by a load in a high frequency circuit;

Figure 2 graphically illustrates the linear relationship between the direct current plate voltage for a high frequency oscillator and the high frequency tank circuit voltage for different loads;

By considering variable voltage, constant current equivalent circuits for no-load and load conditions of a source of high frequency voltage, it is possible, as set forth in Patent Re. 22,258, to denote the equivalent parallel loss resistance introduced by the external load by the following equation:

$$R_1 = R_0 \cdot \frac{e_1}{e_0 - e_1} \tag{1}$$

wherein $R_0$ is the equivalent no-load parallel loss resistance of the unloaded tank circuit, $e_0$ is that value of no-load resonant voltage across the resistance required to produce the no-load power loss in said resistance, $R_1$ is the equivalent parallel load loss resistance, and $e_1$ is that value of resonant load voltage across the resistances required to produce the load power loss in the resistances $R_0$ and $R_1$.

The amount of power absorbed by the external load is equal to $$P = E_1^2 \left( \frac{1}{R_0} \cdot \frac{e_0 - e_1}{e_1} \right) \tag{2}$$

for any actual value $E_1$ of the working voltage across the tank circuit of the high frequency oscillator. In place of $e_0$ and $e_1$ the actual no-load oscillator tank circuit voltage $E_0$ and the actual voltage $E_1$ may be substituted, if $E_1$ is measured at the same value of direct current plate supply voltage as $E_0$, and the following relation is therefore obtained $$P = \frac{1}{R_0}(E_1 E_0 - E_1^2) \tag{3}$$

This relationship may be used to design a power absorption wattmeter which will not require a calibrating adjustment for each different value of power absorbing load resistance $R_1$.

A direct linear relation exists between $E_0$ and the direct current anode voltage $E_b$ of the oscillator, and Equation 3 can be replaced by the equation $$P = \frac{1}{R_0}(E_1 E_b - E_1^2) \tag{4}$$

Figure 2:
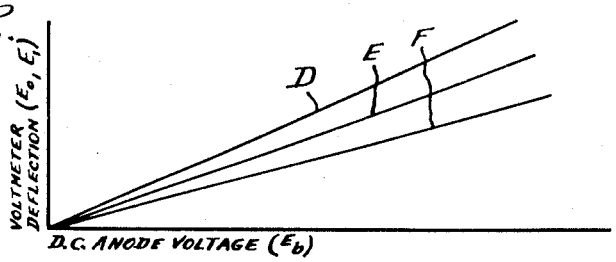

This linear relationship will become evident by referring to Figure 2 wherein the direct current anode or plate supply voltage is plotted as a function of the deflection of a vacuum tube voltmeter connected across the tank circuit of an oscillator, such as A, under no-load conditions indicated by the curve D and under different load conditions indicated by the curves E and F. It is apparent that the voltages $E_0$ and $E_1$ bear a direct linear relation to the direct current plate voltage $E_b$, and hence it is possible to use this direct current plate voltage as an indication or measurement of the no-load voltage $E_0$.

Figure 1:
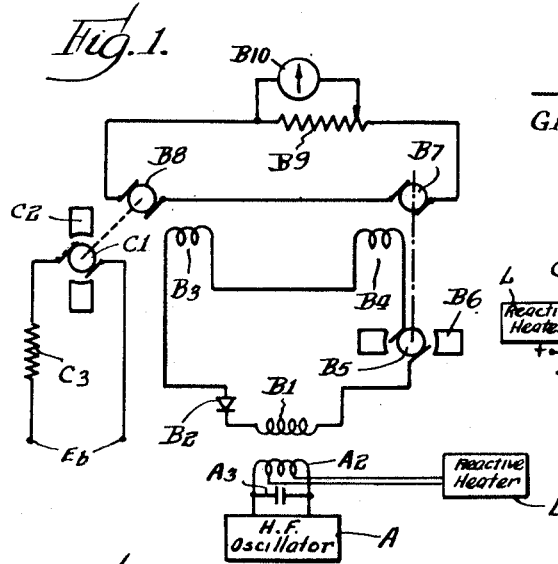

In Figure 1 rectangle A denotes a high frequency vacuum tube oscillator having an output tank circuit including an inductor A2 and a parallel connected capacitor A3, the energy absorbing load or reactive heater being coupled to the inductor A2. Also coupled to the output inductor A2 is a pick-up coil B1 connected in a circuit containing a rectifier B2, a pair of generator or dynamo field coils B3 and B4 and an armature B5 of a motor having permanent magnet pole pieces B6. The field winding B4 is associated with an armature B7 connected in series with the armature B8 which is associated with the field coil B3. A resistor B9, in series with armatures B7 and B8, is provided with an adjustable contact which is connected to a voltmeter B10. The armature B8 is driven by an armature C1 of a motor having a permanent magnet pole piece C2. The armature C1 is connected in series with a resistor C3 and is supplied by current obtained from the direct current anode supply circuit of the high frequency oscillator A. The armatures B5 and B7 are mechanically connected together.

A rectifier B2, connected in series with the pick-up coil B1, supplies to the field coils B3 and B4 a current which is proportional to the high frequency load voltage $E_1$ of the tank circuit of the oscillator A. The armature B5, being energized by the current supplied by the rectifier B2, drives the armature B7 so that voltage generated thereby is proportional to $E_1^2$. The armature B8 is driven by the armature C1, which is energized by a current proportional to $E_b$, but the field winding B3 is energized by a current proportional to $E_1$. Hence, the output voltage or current of the armature B8 is proportional to $E_1 E_b$. The armature B8 is connected in voltage opposition to the armature B7 so that the voltage appearing across the resistor B9 is proportional to $E_1 E_b - E_1^2$. The voltmeter B10 is connected across the resistor or voltage B9 and, therefore, indicates, in accordance with Equation 4, the amount of high frequency power absorbed in the load. This indication will be correct for any arbitrary or changing value of plate supply voltage and for any arbitrary or changing load value.

Figure 3:
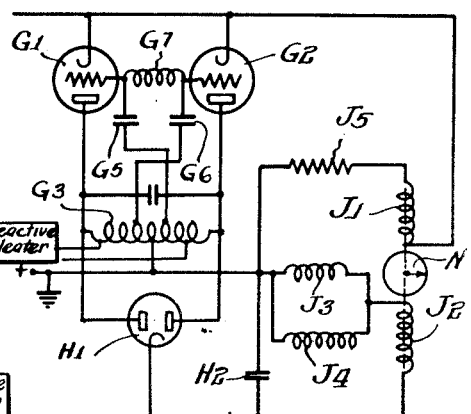
Figure 3 is another embodiment whereby the voltage relationships are utilized to indicate directly the power absorbed by a load.

Another circuit arrangement is illustrated in Figure 3 wherein there has been shown a push-pull high frequency oscillator employing a pair of vacuum tubes G1 and G2 having their cathodes connected to the negative side of a source of anode potential. The positive side of the anode source of potential is connected to ground and to the midpoint of the tank circuit inductor G3 which may be bridged by a tuning capacitor G4. By suitable capacitors G5 and G6 interconnected by a choke coil G7, energy is obtained from suitable taps on the tank inductor G3 for the excitation of the grids of the tubes G1 and G2. This circuit arrangement is merely one example of a suitable type of high frequency vacuum tube oscillator commonly used for supplying high frequency energy for heating purposes. A rectifier H1 having a pair of anodes and a cathode is arranged to have its anodes connected to opposite ends of the tank circuit coil G3. A suitable filter capacitor H2 is connected between the cathode of the rectifier H1 and the midpoint of the tank inductor G3. A double or twin dynamometer indicating instrument is energized by currents proportional to the direct current plate voltage supplied to the oscillator and to currents proportional to the resonant voltage across the tank circuit. The double dynamometer has two armature coils J1 and J2 and two field coils J3 and J4. The armature J1 is connected in series with a resistor J5 so that the armature is energized by current proportional to the direct current voltage supplied to the anodes of the oscillator tubes G1 and G2. The two field coils J3 and J4 are connected in parallel with each other and in series with the armature coil J2. This circuit is energized from the rectifier H1 which delivers current proportional to $E_1$ which is the high frequency voltage appearing across the tank circuit inductor G3. The two armatures J1 and J2 are mechanically connected together and in opposition to operate the common indicator N so that the resultant torque, and hence the deflection of the needle is proportional to the term $E_1(E_0 - E_1)$. The armature coil J2 has half the number of turns of the coil J1 since the current proportional to $E_1$ is equally divided between the field coils J3 and J4.

Figure 4:
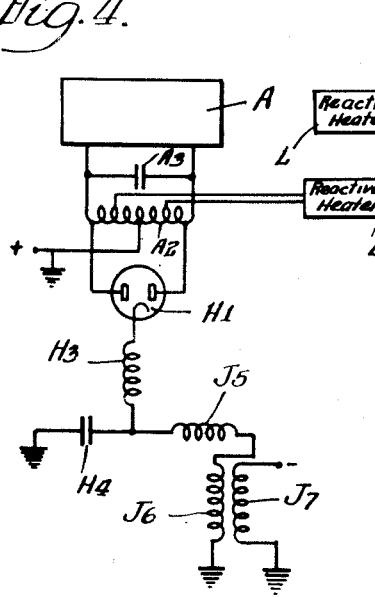
Figure 4 shows another manner of indicating directly the power absorbed.

Figure 4 shows another manner in which power may be taken from the tank coil A2 of an oscillator A and converted by the rectifier H1 to supply a direct current proportional to $E_1$. In this circuit arrangement the rectifier cathode H1 is connected to a choke coil H3 which in turn is connected through a capacitor H4 to ground. The common juncture between the capacitor and the choke coil is connected to the field coil J5 of a dynamometer having two armature coils J6 and J7. The field coil J5 is connected in series with the one armature coil J6 which in turn is connected to ground. The other armature coil J7 is connected between ground and the negative side of the anode potential for the oscillator A. Electrodynamically, the meter produces a torque proportional to the product $E_1(E_0 - E_1)$.

Figure 5:
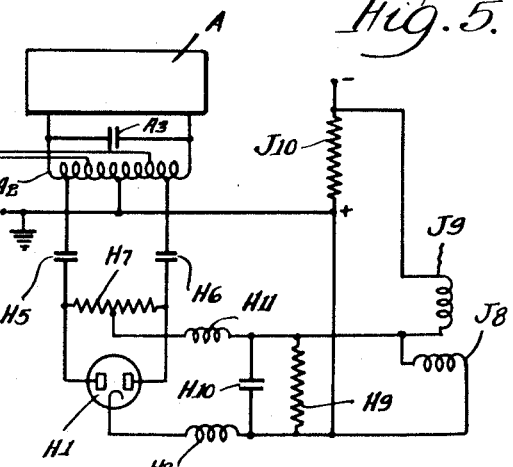
Figure 5 is still another arrangement for indicating the power absorbed by a load.

Figure 5 shows a rectifier H1 coupled by a plurality of capacitors H5 and H6 to suitable tapped positions on the tank inductor A2 of the oscillator A. The resistor H7 is connected between the anodes of the rectifier H1. A choke inductor H8 is connected in the cathode lead to the rectifier H1. An output resistor H9 is connected between the cathode and the midpoint on the resistor H7. A suitable filter capacitor H10 is connected across the resistor H9. Another choke coil H11 is connected between the resistor H9 and the midpoint on the resistor H7. The voltage developed across the resistor H9 is proportional to $E_1$. This resistor is connected to the field coil J8 of a dynamometer having an armature J9. The armature J9 is energized by the voltage difference between the voltage $E_0$ developed across a resistor J10 in the plate supply circuit for the oscillator and the voltage $E_1$ supplied by the rectifier H1. The voltage appearing across the resistor J10 is opposed by the voltage appearing across resistor H9 so that the effective voltage supplied to the armature coil J9 of the dynamometer is equal to $E_0 - E_1$. Electrodynamically the dynamometer multiples these voltages together to satisfy the terms $E_1 E_0 - E_1^2$.

The meters of Figures 3, 4 and 5 may be calibrated by determining a single value of $E_1$ for any arbitrary value of the voltage $E_0$. Having determined this position on the instrument dial all other points of the scale may then be computed so that the indication is in accordance with the requirements of the power equation.

While for the purpose of describing and illustrating the present invention certain circuit arrangements and embodiments have been shown, it is to be understood that the invention is not to be limited thereby since such variations and modifications are contemplated as may be commensurate with the spirit and scope of the invention set forth in the following claims.

This invention is hereby claimed as follows:

1. The method of measuring the power absorbed by a load from the output circuit of a high frequency oscillator comprising deriving a force directly proportional to $E_1$, the voltage of the output circuit under load, deriving another force directly proportional to $E_0$ the no-load voltage of the output circuit, comparing said forces and combining the difference with the first force to produce a force proportional to the power absorbed in said load.

2. A device for measuring the power absorbed by material in a reactive heater coupled to the output circuit of a high frequency electronic tube generator comprising means for developing a voltage proportional to $E_1$, means for developing a voltage proportional to $E_b$, and means for applying said voltages to an indicating means the deflecting force of which is proportional to $E_1(E_b-E_1)$ to cause said indicating means to indicate the power absorbed by said material in said reactive heater where $E_1$ is the voltage of the high frequency power source under load and $E_b$ is proportional to the plate supply voltage of the high frequency tube generator.

3. A device for measuring the power absorbed by loads of different impedance values from the output circuit of a high frequency vacuum tube oscillator comprising means for developing a voltage proportional to $E_1$, means for developing a voltage proportional to $E_b$, and means for applying said voltages to an electrodynamic indicating means energized in accordance with $E_1(E_b-E_1)$ where $E_1$ is proportional to the working voltage of the tank circuit of the oscillator under load and $E_b$ is proportional to the direct current plate voltage of the oscillator at no load.

4. A device for measuring the power absorbed by the load in the output circuit of a high frequency oscillator comprising a pair of generators, means for driving the armature of one generator at a speed directly related to the working voltage of the loaded power circuit, means for driving the armature of the other generator at a speed directly related to the no-load voltage of said output circuit, means for exciting both generators in accordance with the working voltage of the loaded output circuit, and means for comparing the outputs of said generators and for indicating the difference therebetween.

5. A device for measuring the power absorbed by a load in the output circuit of a high frequency oscillator comprising a pair of generators, a direct current motor for driving the armature of one generator at a speed proportional to the working voltage of the loaded output circuit, a second direct current motor for driving the armature of the other generator at a speed proportional to the no-load voltage of said output circuit, means for exciting both generators with current proportional to the working voltage of the loaded output circuit, circuit means for connecting the outputs of said generators in opposition, and a meter for indicating the difference.

6. A device for measuring the power absorbed by a load in the output circuit of a high frequency oscillator heating apparatus comprising a pair of direct current generators, a constant field direct current motor having its armature energized in accordance with the working voltage of the loaded output circuit for driving the armature of one of said generators, a second constant field direct current motor having its armature energized in accordance with the no-load voltage of said output circuit for driving the armature of the other generator, means for exciting both generators with direct current proportional to the working voltage of the loaded output circuit, and means for indicating the difference between the outputs of said generators.

7. A device for measuring the power absorbed by a load in the output circuit of a high frequency heating apparatus comprising a pair of direct current generators, a constant field direct current motor for driving the armature of one of said generators, said motor having its armature energized by current proportional to the working voltage of the loaded output circuit, a constant field direct current motor for driving the armature of the other generator, said second motor having its armature energized with current proportional to the no-load voltage of said output circuit, means including a rectifier energized from the output circuit of said oscillator for supplying exciting current to both generators, means for connecting the outputs of said generators in opposition, and a direct current meter for indicating the power difference therebetween.

8. A device for measuring the power absorbed by a load from the output circuit of a high frequency electronic tube oscillator comprising an electrodynamic meter, means for supplying thereto current directly proportional to the voltage of the output circuit under load, and means for supplying thereto current directly proportional to the plate supply voltage of the electronic tube oscillator.

9. A device for measuring the power absorbed by materials to which heating energy is supplied from the high frequency output circuit of an electronic tube oscillator having a direct current plate supply circuit, said device comprising a direct current electrodynamic meter having a plurality of windings, rectifying means for supplying direct current from the output circuit to certain of said windings of said meter, and means for supplying to the remainder of said windings direct current from the plate supply of the oscillator of said high frequency heating apparatus.

10. A device for measuring the power absorbed by a load from the high frequency tank circuit of an electronic tube oscillator having a plate supply circuit comprising a direct current electrodynamic meter having a plurality of windings, a rectifier connected to the tank circuit of said high frequency oscillator, means interconnecting the output of said rectifier with certain of said windings of said meter, and means for supplying to the remaining of said windings of said meter direct current from the plate supply circuit of said oscillator, said certain and remaining windings being poled for electrodynamic opposition.

11. An arrangement for indicating the power absorbed by a load energized by the output circuit of a high frequency oscillator comprising a direct current indicating instrument having two sets of field and armature windings and a common indicator, a rectifier connected to receive energy from said output circuit and to supply rectified energy to said field windings, means for energizing one of said armature windings with direct current energy received from said rectifier, and means for energizing the other of said armature windings with direct current proportional to the anode voltage of said oscillator, said sets of windings being so poled that one set acts on the indicator in opposition to the other set.

12. An arrangement for indicating the power absorbed by a load energized from the high frequency output circuit of an electronic tube oscillator comprising a direct current instrument having a field winding and two armature windings, a rectifier connected to receive energy from said output circuit and to supply rectified energy to said field winding and one of said armature windings, and means for energizing the other armature winding with direct current proportional to the anode voltage of said oscillator.

13. An arrangement for indicating the power absorbed by a load energized from the high frequency output circuit of an electronic tube oscillator comprising a wattmeter having plural actuating windings, means for applying to one winding of said wattmeter a voltage directly proportional to the voltage of said output circuit, and means constantly comparing said applied voltage with the anode voltage of said oscillator and energizing another wattmeter winding with the difference voltage.

14. An arrangement for indicating the power absorbed by a load energized from the high frequency output circuit of an electronic tube oscillator comprising a direct current wattmeter having a pair of actuating windings, a rectifier energized from said output circuit, means connecting the output of said rectifier to both windings of said wattmeter to apply a voltage thereto, circuit means applying to one winding of said wattmeter, in opposition to the rectified voltage, a voltage derived from the anode supply for said oscillator.

EUGENE MITTELMANN.

REFERENCES CITED

The following references are of record in the file of this patent:

UNITED STATES PATENTS

| Number | Name | Date |
| --- | --- | --- |
| Re. 22,258 | Mittelmann | Jan. 26, 1943 |
| 2,434,544 | Boykin | Jan. 13, 1948 |